United States Patent
Henson

(10) Patent No.: US 11,167,824 B2
(45) Date of Patent: Nov. 9, 2021

(54) HANDLING SYSTEM AND METHOD OF USE THEREOF

(71) Applicant: SEALLS PTY LTD, Point Lookout (AU)

(72) Inventor: John Henson, Point Lookout (AU)

(73) Assignee: SEALLS PTY LTD, Point Lookout (AU)

(*) Notice: Subject to any disclaimer, the term of this patent is extended or adjusted under 35 U.S.C. 154(b) by 105 days.

(21) Appl. No.: 16/494,087

(22) PCT Filed: Mar. 15, 2018

(86) PCT No.: PCT/AU2018/050238
§ 371 (c)(1),
(2) Date: Sep. 13, 2019

(87) PCT Pub. No.: WO2018/165714
PCT Pub. Date: Sep. 20, 2018

(65) Prior Publication Data
US 2021/0114694 A1    Apr. 22, 2021

(30) Foreign Application Priority Data

Mar. 15, 2017   (AU) ................................ 2017900905

(51) Int. Cl.
*B63B 23/32*   (2006.01)
*B63B 27/14*   (2006.01)
(Continued)

(52) U.S. Cl.
CPC ............ *B63B 23/32* (2013.01); *B63B 27/143* (2013.01); *B63B 27/36* (2013.01); *B63C 3/02* (2013.01)

(58) Field of Classification Search
CPC ....... B63B 23/32; B63B 27/143; B63B 27/36; B63C 3/02
See application file for complete search history.

(56) References Cited

U.S. PATENT DOCUMENTS 6,782,842 B1 * 8/2004 Alvord .................... B63B 27/16
                                                          114/259
6,843,198 B1 * 1/2005 Witbeck ................ B63B 25/006
                                                          114/258
(Continued)

FOREIGN PATENT DOCUMENTS

WO         96/37403 A1    11/1996
WO      2010/102419 A2     9/2010
(Continued)

OTHER PUBLICATIONS

Extended European Search Report dated Dec. 16, 2020 from corresponding European Patent Application No. 18767243.1, 8 pages.
(Continued)

*Primary Examiner* — S. Joseph Morano
*Assistant Examiner* — Jovon E Hayes
(74) *Attorney, Agent, or Firm* — Ohlandt, Greeley, Ruggiero & Perle, L.L.P.

(57) ABSTRACT

The present invention concerns a handling system and method for use with a carrier vehicle or structure for unloading from, loading to and storing a smaller vehicle or body aboard the carrier vehicle or structure. The system includes a cradle for supporting a smaller vehicle or body therein. The cradle is mounted to a carrier vehicle or structure and is configured to be pivotable between a tilted position in which a smaller vehicle or body can be unloaded from or loaded into the cradle and a level position in which said smaller vehicle or body is stored aboard the carrier vehicle or structure. The system also includes at least one linear actuator for driving movement of the cradle between said tilted position and said level position.

18 Claims, 6 Drawing Sheets

(51) Int. Cl.
*B63B 27/36* (2006.01)
*B63C 3/02* (2006.01)

(56) References Cited

U.S. PATENT DOCUMENTS

| | | | | |
|---|---|---|---|---|
| 7,712,429 | B1 * | 5/2010 | Gibson | B63B 27/36 |
| | | | | 114/312 |
| 2007/0297856 | A1 * | 12/2007 | Brachet | E02C 5/00 |
| | | | | 405/86 |
| 2008/0202405 | A1 * | 8/2008 | Kern | B63B 23/30 |
| | | | | 114/259 |
| 2012/0024211 | A1 * | 2/2012 | Wiltse | B63B 1/14 |
| | | | | 114/39.21 |

FOREIGN PATENT DOCUMENTS

| | | | | |
|---|---|---|---|---|
| WO | 2012/069853 A2 | 5/2012 | | |
| WO | WO-2012069853 A2 * | 5/2012 | | B63B 23/32 |

OTHER PUBLICATIONS

International Search Report dated May 14, 2018 from corresponding International Patent Application No. PCT/AU2018/050238, 5 pages.
Written Opinion dated May 14, 2018 from corresponding International Patent Application No. PCT/AU2018/050238, 4 pages.

* cited by examiner

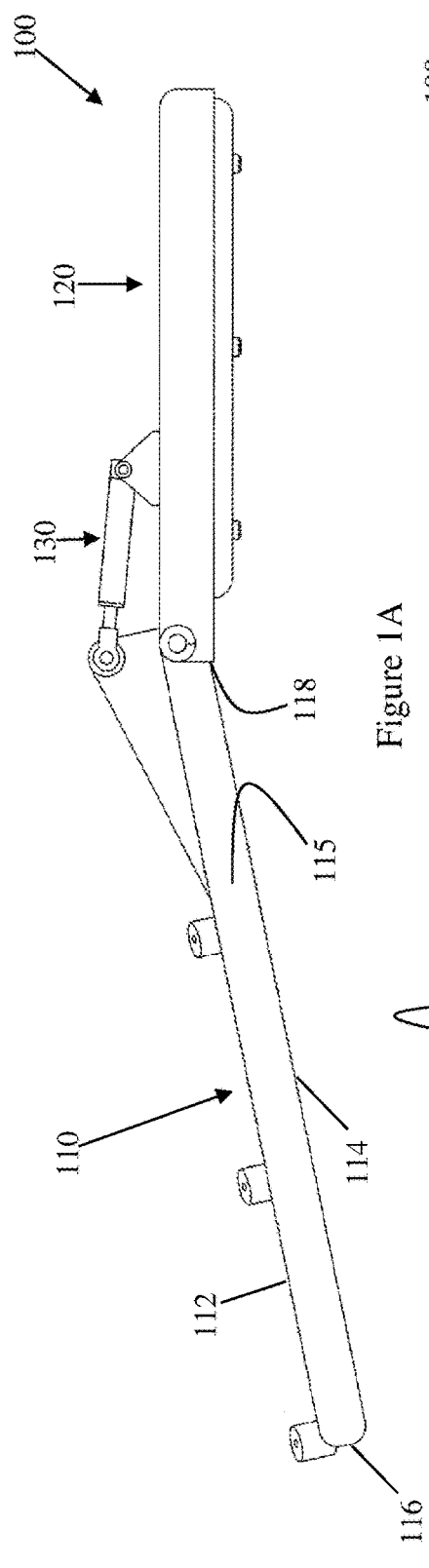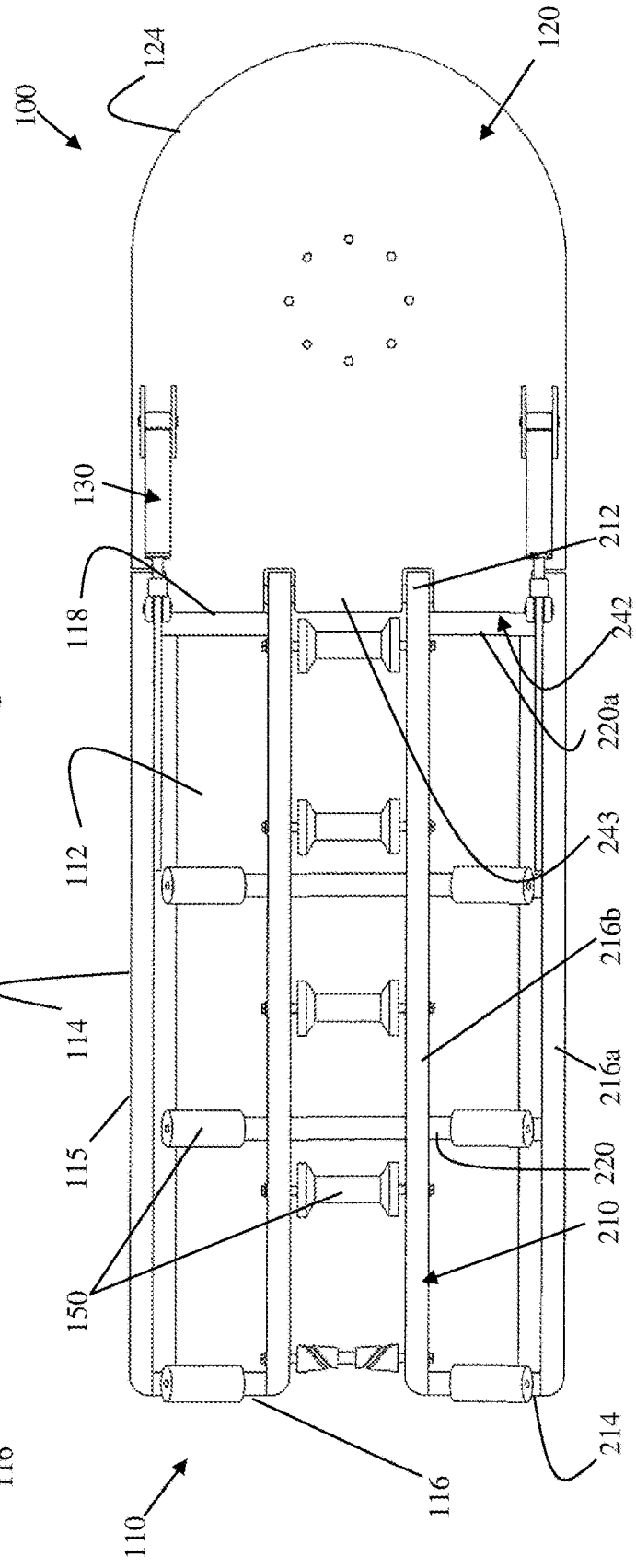
Figure 1A
Figure 1B

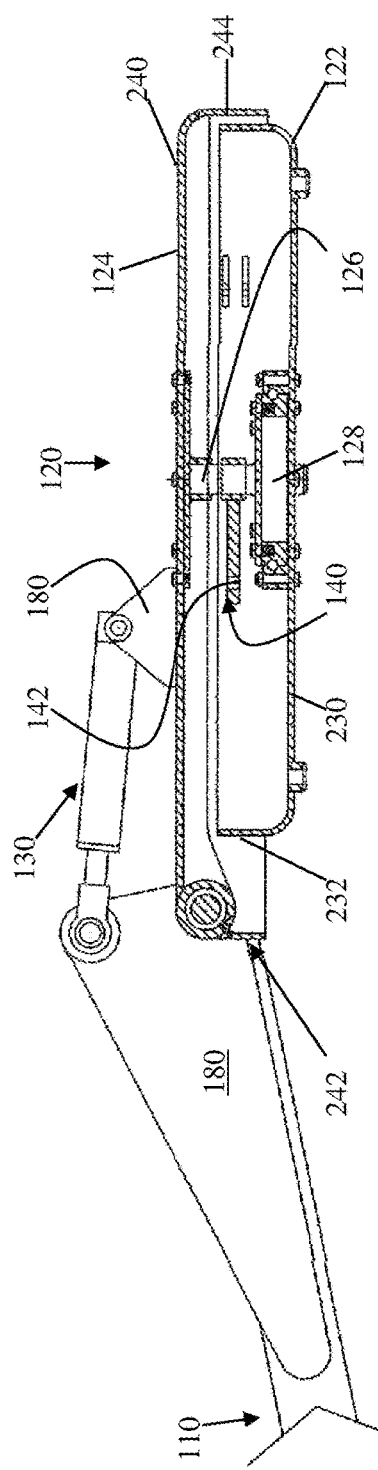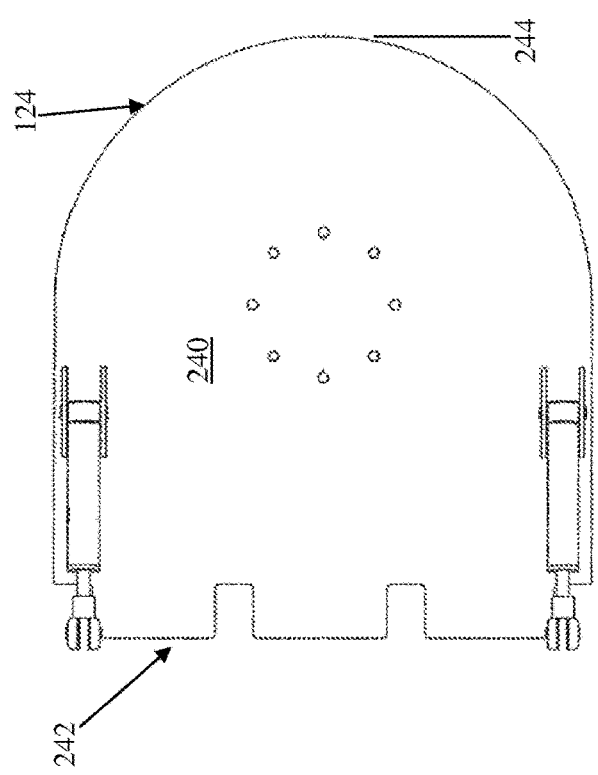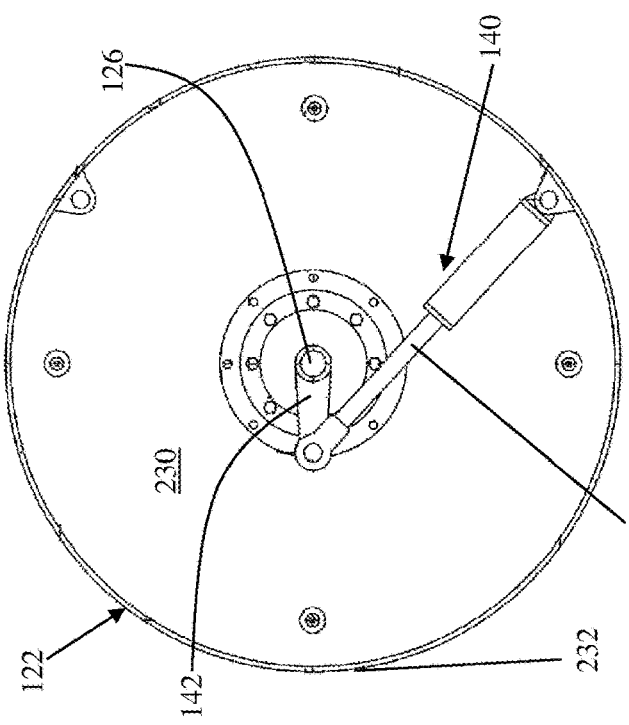
Figure 2A
Figure 2C
Figure 2B

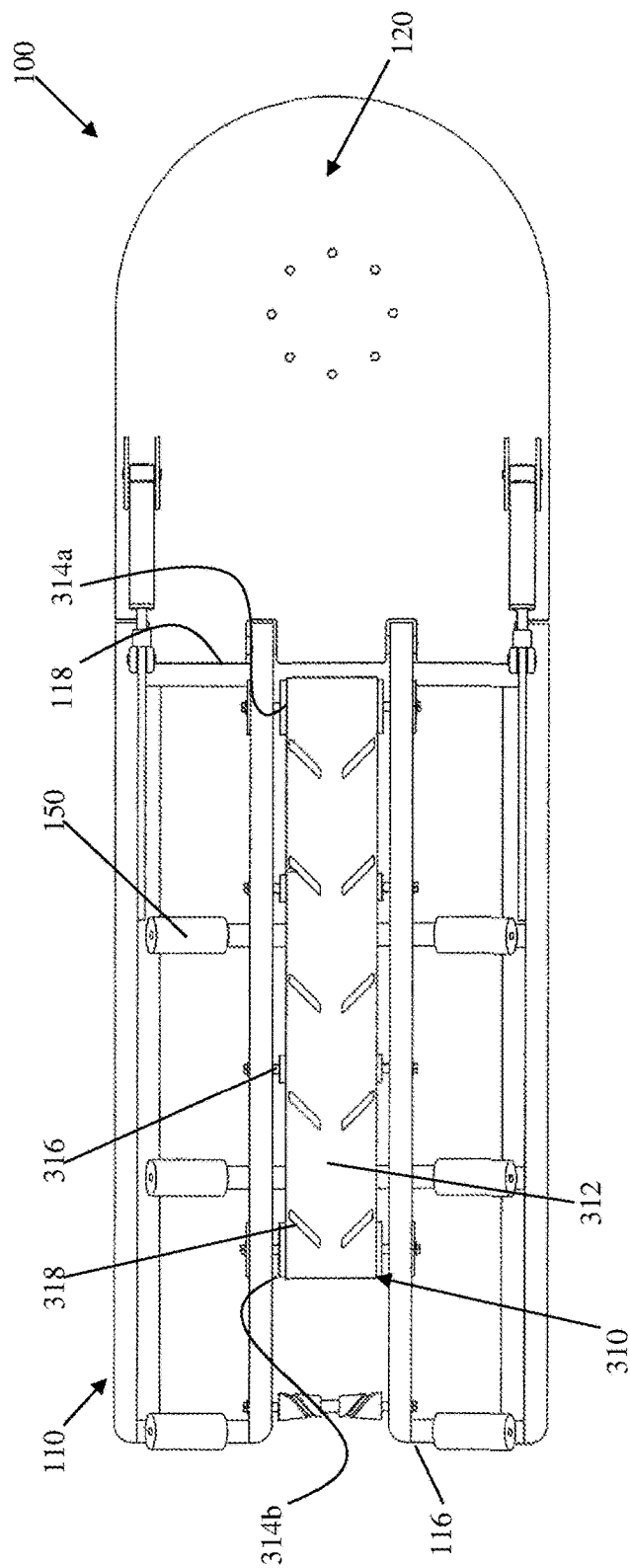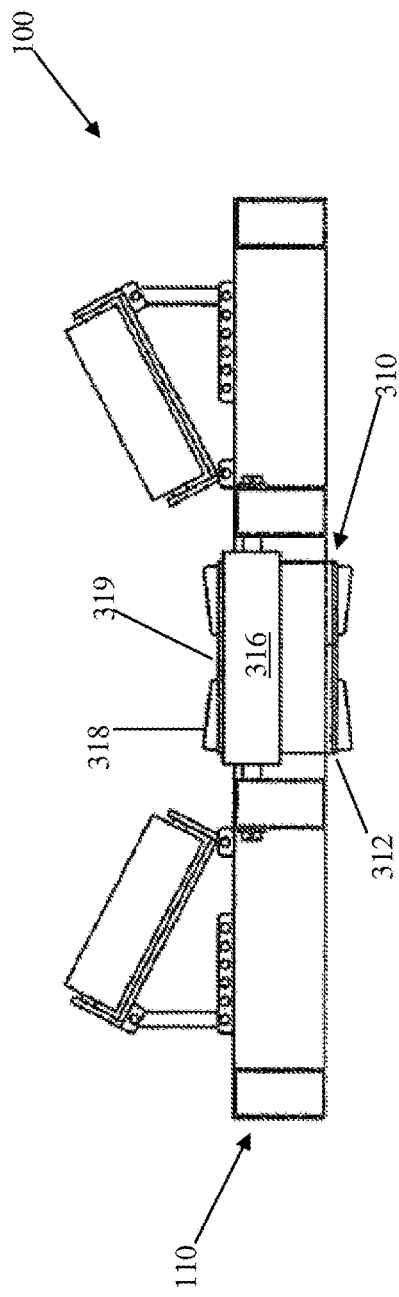
Figure 3A
Figure 3B

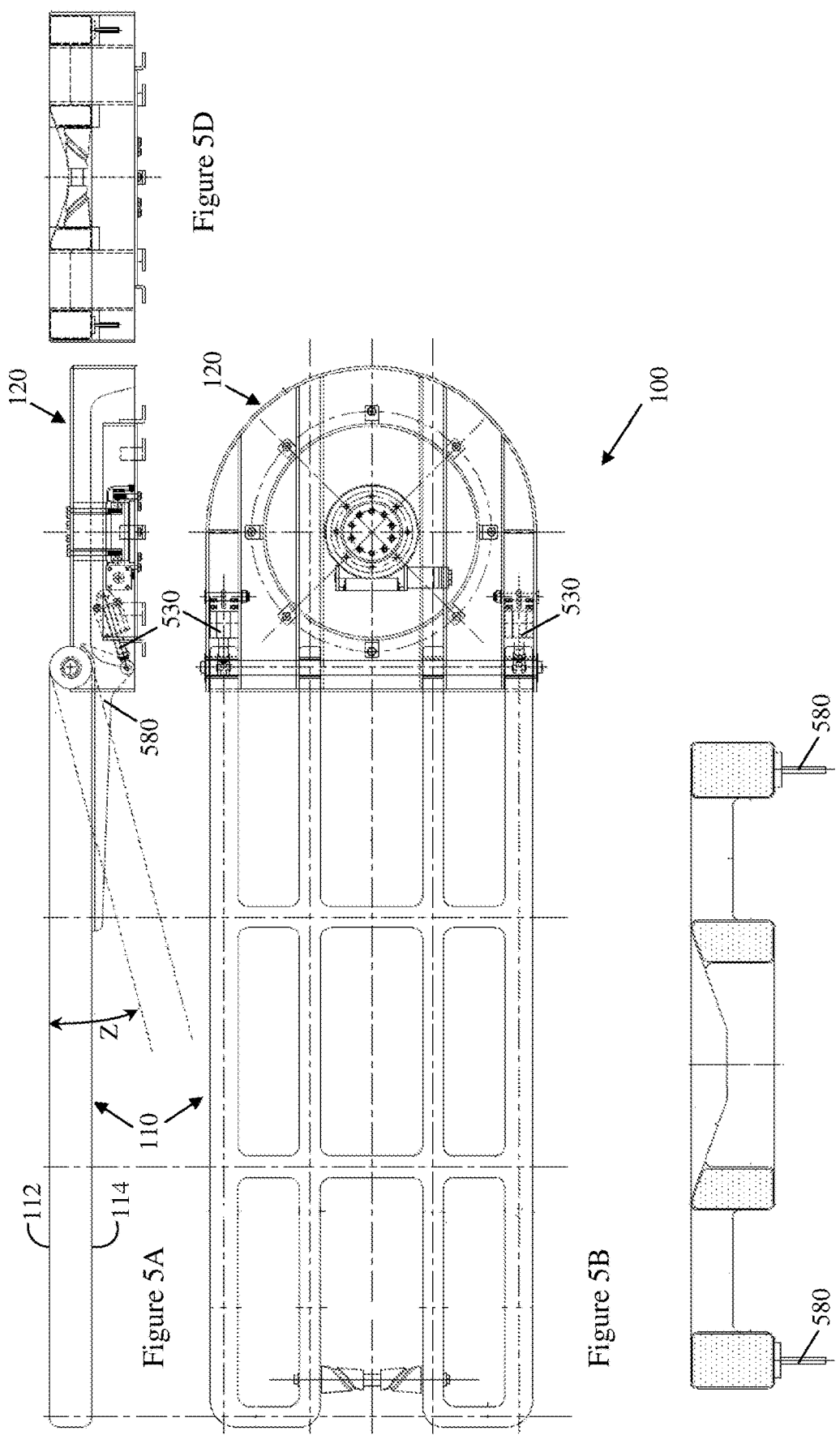

HANDLING SYSTEM AND METHOD OF USE THEREOF

TECHNICAL FIELD

The present invention relates to a handling system and method of use thereof for use with a carrier vehicle or structure for unloading, loading and storing a smaller vehicle.

BACKGROUND

The use of personal watercraft (PWC), such as, e.g., jet skis, water scooters and other watercraft on or in which a rider sits or stands, is an increasingly popular pastime activity. Such PWCs can be readily deployed from or loaded onto a trailer and transported from one body of water to another.

However, PWCs are not so readily deployed from or loaded onto jetties, such as, e.g., a private jetty or pontoon outside a residential dwelling, and larger vessels, such as, e.g., a luxury yacht.

Various systems have been developed to deploy and load PWCs from jetties and larger vessels.

For example, one such system includes simple davits equipped with manual or powered winches for raising or lowering a tethered PWC.

Another such system includes the use of a platform typically attached to a transom or transom board of a vessel or a side of the jetty and arranged to deploy or load a PWC vertically from a position astern and athwartship a deck or transom board of the vessel or from the side of the jetty.

Problems in general with existing systems for deploying and loading PWCs, particularly from larger vessels, is that other than in flat conditions the systems are difficult and often unsafe to use, mainly due to the disparate motion between the PWC and the larger vessel and the inability of the systems to guide and hold the PWC fore and aft and rapidly raise the PWC clear of the water.

Another problem in general with existing systems is that they are typically not compatible for use with multiple PWCs being serially loaded or deployed from a jetty or larger vessel.

Yet a further problem in general with existing systems is that they are overly complicated and costly to manufacture and install.

SUMMARY OF INVENTION

Embodiments of the present invention provide a system and method of use, which may at least partially overcome at least one of the abovementioned problems or provide the consumer with a useful or commercial choice.

According to a first aspect of the present invention, there is provided a handling system for use with a carrier vehicle or structure for unloading, loading and storing a smaller vehicle or body, said system including:

a cradle for supporting the smaller vehicle therein, said cradle configured to be mounted to said carrier vehicle or structure and be pivotable between a tilted position in which said smaller vehicle or body can be unloaded from or loaded into the cradle and a level position in which said smaller vehicle or body is retained and stored in said cradle; and at least one linear actuator for driving movement of said cradle between said tilted position and said level position.

According to a second aspect of the present invention, there is provided a handling system for use with a carrier vehicle or structure for unloading, loading and storing a smaller vehicle or body, said system including:

a cradle for supporting the smaller vehicle or body therein, said cradle configured to be pivotable between a tilted position in which said smaller vehicle or body can be unloaded from or loaded into the cradle and a level position in which said smaller vehicle or body is retained in said cradle;

a rotatable platform mounted to said carrier vehicle or structure to which said cradle is mounted, said platform capable of rotating at least 90° about a vertical axis between an operational position in which said cradle is able to pivot and a storage position in which said smaller vehicle or body is stored aboard the carrier vehicle or structure; and at least one linear actuator for driving movement of said cradle between said tilted position and said level position.

Advantageously, the system of the present invention enables a smaller vehicle or body to be readily and rapidly unloaded from, loaded onto or stored upon a carrier vehicle or structure. The pivotable cradle obviates the difficulties associated with tethered lines and davits of conventional smaller vehicle or body loading systems. Moreover, embodiments of the invention including the rotatable platform, allow the system to be used to readily and rapidly load or unload multiple smaller vehicles one after one another in all but the most severe sea conditions.

The smaller vehicle or body may refer to any vehicle or body capable of being deployed from or loaded onto a larger carrier vehicle. The smaller vehicle or body may be an manned or unmanned vehicle, for example. Likewise, in some embodiments, the smaller vehicle or body may include at least one person, such as, a diver, for example.

In some embodiments, the smaller vehicle or body may include a motorcycle, a quad bike or a motor scooter. In other embodiments, the smaller vehicle or body may include a personal watercraft (PWC), such as, e.g., a jet ski.

The carrier vehicle may include any vehicle greater in size than the smaller vehicle or body and configured to carry the smaller vehicle or body. For example, in some embodiments in which the smaller vehicle or body is a motorcycle, a quad bike or a motor scooter, the carrier vehicle may be a pickup truck, a ute or a coupé utility having a cargo tray or space for receiving the smaller vehicle or body therein. In other embodiments in which smaller vehicle or body is a PWC, the carrier vehicle may preferably be a larger vessel, such as, e.g., a yacht, a landing craft, a RORO vessel, a barge, an offshore support vessel, a rescue vessel or the like.

As used herein, the term "structure" may refer to any fixed structure on which the smaller vehicle or body may be unloaded from, loaded to and stored on. Generally, the structure may be a pontoon, pier or jetty.

The cradle may be of any suitable size, shape and construction and may be formed from any suitable material or materials for supporting the smaller vehicle or body therein. Generally, the cradle may be formed from metal and/or plastic material or materials, preferably aluminium. The cradle may be of unitary construction or may be formed from two or more cradle pieces.

Typically, the cradle may have substantially flat and elongate shape. The cradle may include an upper surface, an opposed lower surface, an outer end, an opposed inner end and opposed longitudinal sides.

The tilted position may preferably be a position in which the outer end of the cradle at least partially rest atop a support surface or is at least partially immersed in a body of water to facilitate the loading or unloading of the smaller vehicle or body. The level position may preferably be a position in which the cradle is substantially horizontal or level.

In some embodiments, the cradle may be in the form of an elongate plate. The upper surface and the lower surface may extend substantially parallel to one another and be interconnected by opposing edges, including an outer end edge, an opposed inner end edge and opposed longitudinal side edges. In some embodiments, the plate may include a concave contour for receiving the smaller vehicle or body.

In other embodiments, the cradle may be in the form of a frame formed from two or more frame members joined together.

For example, the frame may include at least a pair of parallel frame members extending longitudinally between the outer end and the inner end. The pair of parallel frame members may be joined together by one or more transversely extending cross frame members. Typically, the frame members may be joined together using conventional welding techniques or with one or more mechanical fasteners, preferably the former.

The frame members may be of tubular or solid construction and may have substantially circular or rectangular cross-section, preferably tubular with a substantially rectangular cross-section.

In some preferred embodiments, the frame may include an inner pair and an outer pair of parallel frame members extending longitudinally between the outer end and the inner end of the cradle and joined together by at least three transversely extending cross frame members. The outer pair of frame members may preferably define the opposed longitudinal sides of the cradle whereas an innermost and outermost cross frame member may each respectively define the inner end and the outer end of the cradle.

In other preferred embodiments, the frame may include a pair of U-shaped frame members extending longitudinally between the outer end and the inner end of the cradle and joined together by at least three transversely extending cross frame members. Each U-shaped frame member may include a pair of protruding ends located at the inner end of the cradle, a U-shaped portion located at and defining the outer end of the cradle and a pair of frame member portions extending longitudinally between the protruding ends and the U-shaped portion. The pair of frame member portions may include an outer frame member portion defining a longitudinal side of the cradle and an inner frame member portion extending parallel to the outer frame member portion. The at least three cross frame members may be spaced along a longitudinal length of the pair of U-shaped frame members, preferably with a first cross frame member defining the inner end of the cradle and a second and third cross frame member spaced between the inner and outer ends of the cradle.

In some embodiments, the cradle may include one or more rollers to assist in guiding and passage of a smaller vehicle or body onto and off the cradle, preferably in an end-to-end direction.

The rollers may be of any suitable size and shape and may be located in any suitable location on an upper surface of the cradle. The rollers may preferably be free-rotating rollers.

Generally, the cradle may include a plurality of rollers, typically mounted on the upper surface of the cradle. The rollers may preferably be serially arranged along a longitudinal length of the cradle, preferably spaced along the longitudinal length of the cradle. In some embodiments, the rollers may be pivotally mounted permitting the angle of the roller to be adjusted.

In some embodiments, the one or more rollers may be serially arranged along a centre line of the cradle. For example, in some such embodiments, the rollers may be mounted between the inner pair of parallel frame members extending longitudinally between the outer end and the inner end of the cradle. In other such embodiments, the rollers may be mounted between the inner frame member portions of the pair of U-shaped frame members extending longitudinally between the outer end and the inner end of the cradle. In such embodiments, the rollers may preferably be flanged rollers.

In other embodiments, the rollers may be arranged along or adjacently parallel to the opposed sides of the cradle. In such embodiments, the rollers may preferably be angled or pivoted inwards. Typically, the rollers may each be mounted to a cross frame member and/or, in some embodiments, to the U-shaped portion of the pair of U-shaped frame members, preferably near the sides of the cradle.

In some preferred embodiments, the rollers may be arranged along a centre line of the cradle as described above and along or adjacently parallel to the opposed sides of the cradle as described above.

In some embodiments, the cradle may include a conveying mechanism for conveying the smaller vehicle or body onto and off the cradle, preferably in an end-to-end direction.

The conveying mechanism may be of any suitable size, shape and form and may be located in or on the cradle in any suitable location.

Generally, the conveying mechanism may be located on or extend across the upper surface of the cradle, preferably along a centre line of the cradle extending between the inner and outer ends.

For example, in some embodiments, the conveying mechanism may be in the form of one or more powered or driven rollers. The one or more powered or driven rollers may be driven in any suitable way, typically by an operatively associated drive motor, preferably an electric motor.

In other embodiments, the conveying mechanism may be in the form of a conveyer belt extending over and between opposed pulleys located at or near each end of the cradle and supported therebetween by one or more free-rotating rollers, preferably troughed rollers. Typically, the pulleys may include a head pulley located at or near an inner end of the cradle and a tail pulley located at or near the outer end of the cradle. Generally, at least one of the pulleys may be a powered or driven pulley for driving movement of the conveyer belt, preferably the head pulley. Typically, the powered or driven pulley may be operatively associated with a drive motor, preferably an electric motor.

The conveyer belt may typically be formed from a flexible resilient material or materials, such as, e.g., rubber or plastic.

In some embodiments, an outer surface of the conveyer belt may include textured surface to facilitate in gripping the smaller vehicle or body.

Likewise, in other embodiments, the outer surface of the conveyer belt may include a plurality of outwardly protruding ridges to assist in gripping the smaller vehicle or body. The protruding ridges may be arranged in any suitable arrangement on the outer surface of the conveyer belt.

For example, in some embodiments, the protruding ridges may extend transversely across the outer surface of the conveyer belt.

In other embodiments, the protruding ridges may be angled across the outer surface of the conveyer belt.

In yet other embodiments, the protruding ridges may be arranged in chevrons extending in a common direction along a length of the outer surface of the conveyer belt.

In preferred embodiments, the protruding ridges may be arranged in opposed or converging diagonal pairs. In some such embodiments, the opposed or converging diagonal pairs may define a space therebetween for at least partially receiving a portion or part of the smaller vehicle or body.

For example, in embodiments in which the smaller vehicle or body is a motor cycle, each tyre of the motor cycle may be at least partially received between the opposed or converging diagonal pairs to at least partially facilitate in keeping the motor cycle in an upright position when unloading, loading or storing the motor cycle on the cradle.

For example, in embodiments in which the smaller vehicle or body is a PWC, a keel of the PWC may be at least partially received between the opposed or converging diagonal pairs to at least partially facilitate in keeping the PWC in an upright position when unloading, loading or storing the PWC on the cradle.

The cradle may be mounted to the carrier vehicle or structure in any suitable way to allow the cradle to be pivotable between the tilted position and the level position, typically via the inner end so that the outer end may be pivotable between the tilted position and the level position. The cradle may be directly or indirectly pivotally mounted to the carrier vehicle or structure, for example.

In some embodiments, the inner end of the cradle may be hingedly connected or coupled to the carrier vehicle or structure, preferably an outer edge of carrier vehicle or structure.

In other embodiments, the cradle may be pivotally mounted to one or more cradle mounts each fastened in a suitable location on the carrier vehicle or structure, for example.

Conversely, in yet other embodiments, the one or more cradle mounts may be fastened to the cradle and may each be pivotally mounted to the carrier vehicle or structure.

Each cradle mount may be of any suitable size, shape and construction and may preferably be connectable to the inner end of the cradle in any suitable way.

For example, in some embodiments, the cradle may include one or more bearings located at or near the inner end and each cradle mount may include a bracket connectable to the carrier vehicle or structure and one or more pivot pins for pinning the bearings at the inner end of the cradle to each of the brackets. The bearings may or may not each include a polymer bushing.

In other embodiments, the cradle mounts may each include a bearing. Again, the bearing may or may not include a polymer bushing. The inner end of the cradle may include one or more pivot pins for pinning the inner end of the cradle to each bearing associated with each of the cradle mounts.

In some embodiments, the cradle mounts may be slidably connected to the carrier vehicle or structure, preferably in a linear arrangement to an upper surface of the carrier vehicle or structure. The cradle mounts may be slidably connected to the carrier vehicle or structure in any suitable way. For example, each cradle mount may be slidably connected to a shaped groove or channel extending linearly across the upper surface of the carrier vehicle or structure. Each cradle mount may preferably be retainable and slideable within the shaped groove or channel such that the cradle mount is able to move along the shaped groove or channel but is prevented from separating away from the shaped groove or channel.

In such embodiments, the cradle mounts may preferably be slideable in a linear direction between a position adjacent an edge of the upper surface of the carrier vehicle or structure and a retracted position located away from the edge.

For example, in embodiments, in which the carrier vehicle is a pickup truck, a ute or a coupe utility having a cargo tray or space for receiving the smaller vehicle or body therein, the cradle mounts may be slidably mounted to the cargo tray and may be slideable in a linear direction between a position adjacent a rear edge of the cargo tray and a retracted position away from the edge.

In other embodiments, in which the carrier vehicle is yacht, the cargo mounts may be slidably mounted to an upper surface of the yacht, preferably astern, and may be slidable between a position adjacent an edge of the upper surface and a retracted position away from the edge.

In yet other embodiments, in which the structure is a pontoon, pier or jetty, the cargo mounts may be slidably mounted to an upper surface of the pontoon, pier or jetty and may be slidable between a position adjacent an edge of the upper surface and a retracted position away from the edge.

Advantageously, by having slideable cargo mounts, the cradle may be slid together with the cradle mounts into the retracted position when in the level position for storage of the smaller vehicle or body when loaded or the cradle when unloaded.

In other embodiments, the cradle mounts may be slidably connected to a lower surface of the cradle, preferably in a linear arrangement extending between the inner and outer ends of the cradle. Each cradle mount may, in turn, be pivotally mounted to the carrier vehicle or structure, preferably at or near an edge of an upper surface of the carrier vehicle or structure.

Again, the cradle mounts may be slidably connected to the cradle in any suitable way. For example, each cradle mount may be slidably connected to a shaped groove or channel extending linearly along the lower surface of the cradle. Each cradle mount may preferably be retainable and slideable within the shaped groove or channel such that the cradle mount is able to move along the shaped groove or channel but is prevented from separating away from the shaped groove or channel.

In such embodiments, the cradle mounts may be slideable towards the inner end of the cradle to enable the cradle to pivot between the tilted position and the level position for unloading or loading the smaller vehicle or body. The cradle mounts may be slideable towards the outer end of the cradle when in the level position for storage of the smaller vehicle or body when loaded or the cradle when unloaded In yet other embodiments, the cradle may be pivotally mounted to the carrier vehicle or structure by a connecting mechanism or part of a connecting mechanism. For example, a first part of a connecting mechanism associated with the inner end of the cradle may mate with or engage with a second part of the connecting mechanism associated with the carrier vehicle or structure, typically an upper surface of the carrier vehicle structure.

The connecting mechanism may include mateable male and female portions that pivotally couple together, including interference fit connections, for example. The connecting mechanism may include a male formation associated with the inner end of the cradle configured to be inserted into or coupled with a female formation associated with the carrier vehicle or structure. Conversely, the connecting mechanism may include a female formation associated with the inner end of the cradle configured to at least partially receive or be coupled with a male formation associated with the carrier vehicle or structure.

As indicated above, in some embodiments, the cradle may be pivotally mounted to a rotatable platform capable of rotating at least 90° about a vertical axis between an operational position in which said cradle is able to pivot and a storage position in which said smaller vehicle or body is stored aboard the carrier vehicle or structure.

The rotatable platform may be of any suitable size, shape and construction and may be formed from any suitable material or materials. Likewise, the cradle may be pivotally mounted to the rotatable platform in any suitable way.

Generally, the rotatable platform may be formed from metal and/or plastic material or materials, preferably steel, more preferably marine grade steel. The rotatable platform may preferably be formed from two or more platform pieces.

Typically, the rotatable platform may include a non-rotational lower portion fastened to the carrier vehicle or structure and a rotatable upper portion rotatably coupled to the non-rotational lower portion such that the upper portion may rotate relative to the lower portion. The cradle may preferably be pivotally mounted to the rotatable upper portion.

The non-rotational lower portion may be of any suitable size, shape and construction to be fastened to the carrier vehicle or structure. Typically, the non rotational-lower portion may be in the form of a plate. The plate may have a substantially circular or polygonal shape. The plate may have opposed surfaces extending substantially parallel to one another, including a lower surface and an opposed upper surface. The opposed surface may be interconnected by at least one edge. Typically, the plate may include one or more openings for receiving one or more mechanical fasteners therethrough for fastening the plate to the carrier vehicle or structure.

In some embodiments, the plate may include at least one sidewall extending upwardly from the at least one edge. The at least one sidewall may extend at least partially around a periphery of the lower portion, preferably entirely.

Similarly, the rotatable upper portion may be of any suitable size, shape and construction to be rotatable relative to the lower portion and be pivotally mounted to the cradle. The upper portion may be of the same size and shape as the lower portion or not.

Typically, like the lower portion, the upper portion may also be in the form of a plate. The plate may have a substantially circular or polygonal shape. The plate may have opposed surfaces extending substantially parallel to one another, including a lower surface and an opposed upper surface. The opposed surface may be interconnected by at least one edge. In some embodiments, the plate may include at least one sidewall extending downwardly from the at least one edge to at least partially conceal the lower portion. The at least one sidewall may extend at least partially around a periphery of the upper portion.

The upper portion may be rotatably coupled to the lower portion in any suitable way.

Generally, the upper and lower portions may be coupled together by a central shaft extending therebetween. The central shaft may longitudinally extend between two opposed ends, and may have a substantially circular cross section. The central shaft may be fixedly mounted to one of the upper portion and the lower portion at a first end and rotatably mounted to the other of the upper portion and the lower portion at an opposed second end, preferably via a rotary bearing or a mount including a rotary bearing.

As indicated above, the cradle is mounted to the rotatable platform, preferably pivotally mounted so that said cradle is able to pivot between the tilted position and the level position.

Again, the cradle may be pivotally mounted to the rotatable platform in any suitable way, typically via the inner end.

In some embodiments, the inner end of the cradle may be hingedly connected or coupled to the rotatable platform, preferably an edge portion of the rotatable upper portion of the rotatable platform.

In other embodiments, the cradle may be pivotally mounted to one or more cradle mounts each fastened in a suitable location on the rotatable upper portion of the rotatable platform.

Conversely, in yet other embodiments, the one or more cradle mounts may be fastened to the cradle and may each be pivotally mounted to the rotatable upper portion of the rotatable platform.

Each cradle mount may be of any suitable size, shape and construction and may preferably be connectable to the inner end of the cradle in any suitable way.

For example, in some embodiments, the cradle may include one or more bearings located at or near the inner end and each cradle mount may include a bracket connectable to the rotatable upper portion of the rotatable platform and one or more pivot pins for pinning the bearings at the inner end of the cradle to each of the brackets. The bearings may or may not each include a polymer bushing.

In other embodiments, the cradle mounts may each include a bearing. Again, the bearing may or may not include a polymer bushing. The inner end of the cradle may include one or more pivot pins for pinning the inner end of the cradle to each bearing associated with each of the cradle mounts.

In some embodiments, the cradle mounts may be slidably connected to the rotatable upper portion of the rotatable platform or the cradle as previously described.

In yet other embodiments, the cradle may be pivotally mounted to the rotatable upper portion of the rotatable platform by a connecting mechanism or part of a connecting mechanism. For example, a first part of a connecting mechanism associated with the inner end of the cradle may mate with or engage with a second part of the connecting mechanism associated with the rotatable upper portion of the rotatable platform, typically an edge portion of the rotatable upper portion.

The connecting mechanism may include mateable male and female portions that pivotally couple together, including interference fit connections, for example. The connecting mechanism may include a male formation associated with the inner end of the cradle configured to be inserted into or coupled with a female formation associated with the rotatable upper portion. Conversely, the connecting mechanism may include a female formation associated with the inner end of the cradle configured to at least partially receive or be coupled with a male formation associated with the rotatable upper portion.

In preferred embodiments, the inner edge of the cradle may be hingedly connected to an edge portion of the rotatable upper portion of the rotatable platform.

For example, in one such embodiment, the edge portion of the rotatable upper portion may include at least one protruding connecting member having a central bore therethrough, and the inner edge of the cradle may likewise include at least two protruding connecting members each having a central bore therethrough configured to intermesh with the at least one protruding connecting member of the edge portion and be pinned together by at least one pivot pin received through the central bores when co-aligned.

In another such embodiment, the edge portion of the rotatable upper portion may include at least two protruding connecting members each having a central bore therethrough, and the inner edge of the cradle may likewise include at least one protruding connecting member having a central bore therethrough configured to intermesh with the at least two protruding connecting members of the edge portion and be pinned together by at least one pivot pin received through the central bores when co-aligned.

In a preferred such embodiment, the four protruding ends of the frame forming the cradle may each have a central bore therethrough and be configured to intermesh with at least three protruding connecting members extending along the edge portion of the rotatable upper portion and each having a central bore therethrough. The protruding ends and the protruding connecting members may be pinned together by at least one pivot pin received through the central bores when co-aligned.

As indicated above, movement of the cradle between the tilted position and the level position may be driven by the at least one linear actuator. The at least one linear actuator may be of any suitable size, shape and form and may be associated with the cradle and the carrier vehicle, structure or rotatable platform in any suitable way for moving between an extended position and a retracted position and driving movement of the cradle between the tilted and level positions.

For example, the linear actuator may be manually moved between the positions or may be powered, such as, e.g., by an electric motor. The linear actuator may be a pneumatic or hydraulic ram, for example. Conversely, the linear actuator may be a servomotor or stepper motor configured to pivot the cradle between the tilted and level positions. In some embodiments, the linear actuator may be a rigid chain actuator (also known as linear chain actuator, a push-pull chain actuator, an electric chain actuator, a zip chain actuator or a column-forming chain actuator). In other embodiments, the linear actuator may be a manually or electrically powered screw jack or screw actuator.

For example, the linear actuator may be pivotally coupled to each of the cradle and the carrier vehicle, structure or rotatable platform for pivoting the cradle between the tilted and level positions. The linear actuator may preferably be pivotally coupled to each of cradle and the carrier vehicle, structure or rotatable platform by mounting brackets respectively located on each. In one embodiment, at least one mounting bracket is fastened to an upper surface or lower surface of the cradle. In a preferred embodiment, at least one mounting bracket is fastened to the lower surface of the cradle. Preferably, two mounting brackets are fastened to the lower surface of the cradle. In another embodiment, at least one mounting bracket is fastened to a lower surface of the cradle and the at least one linear actuator for movement of the cradle between the tilted and level positions extends between said at least one mounting bracket and the interior of the rotatable platform. In an alternative embodiment, the handling system comprises two mounting brackets fastened to the lower surface of the cradle and two linear actuators, each actuator extending between a mounting bracket on the lower surface of the cradle and the interior of the rotatable platform.

Typically the linear actuator may be in the form of a hydraulic ram that may extend between a portion of the cradle and a portion of the carrier vehicle, structure or rotatable platform for pivoting the cradle between the tilted and level positions.

For example, in some embodiments, the linear actuator may extend between a location on the lower surface of the cradle and a portion of the carrier vehicle, structure or rotatable platform for pivoting the cradle between the tilted position when the linear actuator is retracted and the level position when the linear actuator is extended.

In other embodiments, the linear actuator may extend between a location on the upper surface of the cradle and a portion on the carrier vehicle, structure or rotatable platform for pivoting the cradle between the tilted position when the linear actuator is extended and the level position when the linear actuator is retracted.

In preferred embodiments, the linear actuator may extend at least partially along a side of the upper surface of the cradle. In more preferred embodiments, the system may include at least two linear actuators each extending at least partially along opposed sides of the upper surface of the cradle for pivoting the cradle between the tilted and level positions.

The at least two linear actuators may typically extend between a mounting bracket fastened to the upper surface of the cradle and a mounting bracket fastened to an upper surface of the carrier vehicle, structure or rotatable platform. Each linear actuator may be pivotally coupled at both ends to the respective mounting brackets.

The mounting bracket or brackets on the cradle may typically extend up from a location at or near side of the upper surface, preferably near the inner end of the cradle.

Likewise, the mounting bracket or brackets on the carrier vehicle, structure or rotatable platform may typically extend up from the upper surface at a location at or near an edge or portion connected to the cradle.

The mounting brackets and the at least one linear actuator may be pivotally coupled together in any suitable way. Typically, however, the at least one actuator may include a bearing at each end configured to be pinned to an opening in a respective mounting bracket by a pivot pin, for example.

In some embodiments, the system may further include an actuating mechanism for rotating the upper portion of the rotatable platform relative to the lower portion between the operational position and the storage position. Any suitable type of actuating mechanism may be used. The actuating mechanism may be manually actuated or by using a drive system, for example.

For example, if manually actuated, the actuating mechanism may include an operable handle or crank associated with one or more gears or cog wheels operatively associated with the central shaft extending between the upper and lower portions of the rotatable platform. The one or more gears or cog wheels may be configured to mesh with one another when the handle or crank is turned and transmit torque to the central shaft to thereby rotate the upper portion of the rotatable platform relative to the lower portion.

In some embodiments, the drive system may include a drive motor such as, e.g., an electric motor or combustion engine operatively associated with the central shaft for rotating the central shaft. Typically, a shaft of the drive motor may be interconnected with the central shaft by one or more gears, chains, pulleys, belts or other linkages, and may also, optionally use one or more clutches. Preferably, the drive motor may be interconnected with the central shaft by one or more gears capable of driving rotation of the central shaft at different rotational speeds and/or in different rotational directions.

In other embodiments, drive system may include a crank or lever arm extending perpendicularly from the central shaft and at least one linear actuator pivotally coupled to an outer end of the crank or lever arm and an inner periphery of the lower portion of the rotatable platform. The linear actuator may be of any suitable form as previously described. Reciprocating movement of the linear actuator between extended and retracted positions may impart rotational movement to the central shaft to rotate the upper portion of the rotatable platform relative to the lower portion. In other embodiments, the drive system comprises an actuator selected from a reduction gear consisting of a worm shaft and worm gear or a planetary reducer driving the rotatable upper portion between the operational position and the storage position, wherein the planetary reducer is driven manually or by a motor selected from the group consisting of a hydraulic motor, a pneumatic motor, and an electric motor.

In some embodiments, the cradle may further include at least one load cell configured to measure the weight of the smaller vehicle or body supported therein.

The at least one load cell may be of any suitable form and may be associated with the cradle in any suitable way. For example, the at least one load cell may be a strain gauge load cell, a piezoelectric load cell, a hydraulic load cell or a pneumatic load cell, preferably a strain gauge load cell.

In use, the at least one load cell may be used to determine if the cradle is overloaded.

In some embodiments, the system may further include at least one amplifier for amplifying an output electrical signal from the at least one load cell. The at least one amplifier may be operatively connected to the at least one load cell via an electrical circuit.

In some embodiments, the system may further include an analog-to-digital converter for converting an amplified output electrical signal from the at least one amplifier from an analog signal to a digital signal. The analog-to-digital converter may be operatively connected to the at least one amplifier via the electrical circuit.

In some embodiments, the system may further include a microcomputer, including one or more processors and a memory, for receiving and processing the digital signal from the analog-to-digital converter, calculating the weight of the smaller vehicle or body loaded onto the cradle, determining whether the weight calculated exceeds the capacity of the cradle, optionally generating a signal based on said determining to alert a user, and/or optionally disabling operation of the system (e.g., isolating the at least one linear actuator and/or drive system).

In some embodiments, the system may further include a power source. The power source may include an on-board power source, such as, e.g., one or more batteries, and/or may receive power from an external source.

The system may include a communications module for connecting the system to an external device, such as, e.g., an external processing device (e.g., computer, tablet, smart phone, smart watch or PDA), an external display, a printer or a storage device (e.g., a hard drive). The system may be connected to an external device in any suitable way.

For example, the communication module may be in the form of a port or access point (e.g., a USB or a mini-USB port) such that the jack may be connected to an external device using a suitable cable.

For example, the communication module may be in the form of a wireless communication module, such as, e.g., a wireless network interface controller, such that the system may wirelessly connect to an external device through a wireless network (e.g., Wi-Fi (WLAN) communication, RF communication, infrared communication, or Bluetooth™).

In some embodiments, the system may further include a controller for controlling operation of the at least linear actuator for controlling movement of the cradle between the tilted and level positions. In some embodiments, the controller may further control operation of the drive motor for controlling operation of the conveying mechanism. In some embodiments, the controller may further control operation of the drive system for controlling rotation of the rotatable platform between the operational and storage positions. The controller may be of any suitable size, shape and configuration.

In preferred embodiments, the controller may be a remote controller configured to be held by a user. The remote controller may be a wired remote or a wireless remote. The remote controller may include one or more keys, buttons or dials for controlling various aspects of functionality of the at least one linear actuator and/or the drive system. In some embodiments, the remote controller may further include a display for displaying operating information of the system, such as, e.g., the weight of the smaller vehicle or body and/or the operating position of the cradle and/or the rotatable platform.

According to a third aspect of the present invention, there is provided a method of unloading or loading a smaller vehicle or body from a carrier vehicle or structure using the system of the first aspect, said method including:

pivoting said cradle to the tilted position in which the smaller vehicle or body can be unloaded from or loaded onto said cradle.

According to a fourth aspect of the present invention, there is provided a method of unloading or loading a smaller vehicle or body from a carrier vehicle or structure using the system of the second aspect, said method including:

rotating said cradle to the operational position; and pivoting said cradle to the tilted position in which the smaller vehicle or body can be unloaded from or loaded onto said cradle.

The method may include one or more features or characteristics of the system as hereinbefore described, including the cradle and the rotatable platform.

In some embodiments, the rotating may typically include operating the rotatable platform to rotate the upper portion relative to the lower portion to thereby rotate said cradle. The rotating may be manually driven by use of an actuating mechanism such as an operable handle or crank. Conversely, the rotating may be powered by a drive system as previously described.

The pivoting may typically be driven by the at least one linear actuator operatively associated with the cradle for driving movement of the cradle between the level position and the tilted position. Typically, the cradle may be pivoted to the tilted position in which the outer end of the cradle at least partially rests against a support surface or is at least partially immersed in a body of water to facilitate loading or unloading of the smaller vehicle or body.

Once the cradle has been pivoted to the tilted position, the smaller vehicle or body may be unloaded or loaded from the cradle.

In some embodiments, the method may include returning the cradle to a level position and/or rotating the cradle to the storage position to reload the cradle with another smaller vehicle or body to be unloaded from the carrier vehicle or structure.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows:

FIGS. 1A and 1B respectively show a side view and an elevated view of a handling system according to an embodiment of the present invention;

FIGS. 2A to 2C respectively show a sectional side view, a bottom view and a top view of part of the handling system as shown in FIGS. 1A and 1B; and FIGS. 3A and 3B respectively show an elevated view and a sectional view of a handling system according to another embodiment of the present invention.

FIGS. 4A to 4F are not drawn to scale.

FIGS. 5A to 5F show various views of a handling system according to yet another embodiment of the present invention. FIG. 5A is a side view. FIG. 5B is a top view. FIG. 5C is a sectional end view. FIG. 5D is an end view. FIG. 5E shows part of the handling system as shown in FIG. 5A. FIG. 5F shows part of the handling system as shown in FIG. 5B.

DETAILED DESCRIPTION

Figure 4A:
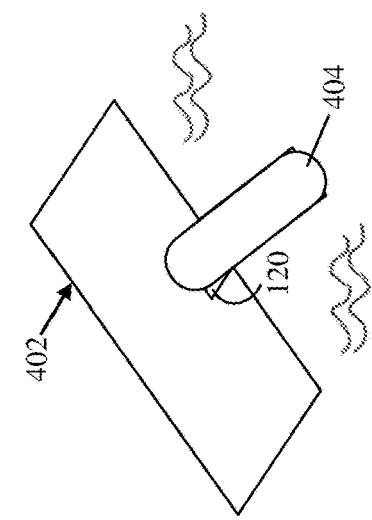
FIGS. 4A to 4F respectively show a simplified schematic of a method of loading a jet ski onto a boat using the handling system of FIGS. 1 to 3.

FIGS. 1A and 1B show a handling system (100) according to an embodiment of the present invention for unloading, loading and storing a smaller vehicle or body, such as, e.g., a motor cycle or personal watercraft (PWC), on a carrier vehicle or structure, such as, e.g., a pickup truck, yacht, larger vessel, pontoon, pier or jetty.

Referring to FIGS. 1A and 1B, the handling system (100) includes a cradle (110) for supporting a smaller vehicle or body therein and pivoting between a tilted position for unloading or loading the smaller vehicle or body and a level position for storing the smaller vehicle or body therein; and a rotatable platform (120) to which the cradle (110) is hingedly connected, the platform (120) being mounted to a carrier vehicle or structure and being capable of rotating at least 90° about a vertical axis between an operational position in which the cradle (110) is able to pivot and a storage position in which the smaller vehicle or body is stored aboard the carrier vehicle or structure. The handling system (100) further includes two hydraulic rams (130) for driving movement of the cradle (110) between the tilted and level positions; and an actuating mechanism (140; shown only in FIGS. 2A and 2B) for rotating the rotatable platform (120) between the operational and storage positions.

The cradle (110) has a substantially flat and elongate shape and includes an upper surface (112), an opposed lower surface (114), an outer end (116), an opposed inner end (118) and opposed longitudinal sides (115).

Referring to FIG. 1B, the cradle (110) comprises a frame formed from two or more frame members joined together. The frame members are of tubular construction and have substantially rectangular cross-section.

Specifically, the frame includes a pair of U-shaped frame members (210) extending longitudinally between the outer end (116) and the inner end (118) of the cradle (110) and joined together by three transversely extending cross frame members (220).

Each U-shaped frame member (210) includes a pair of protruding ends (212) located at the inner end (118) of the cradle (110), a U-shaped portion (214) located at and defining the outer end (116) of the cradle (110) and a pair of frame member portions (216) extending longitudinally between the protruding ends (212) and the U-shaped portion (214). The pair of frame member portions (216) includes an outer frame member portion (216a) defining a longitudinal side (115) of the cradle (110) and an inner frame member portion (216b) extending parallel to the outer frame member portion (216a).

The at least three cross frame members (220) are spaced along a longitudinal length of the pair of U-shaped frame members (210) with a first cross frame member (220a) defining the inner end (118) of the cradle (110) and a second and a third cross frame member (220) spaced between the inner and outer ends (116, 118) of the cradle (110).

As shown, the cradle (110) includes a plurality of rollers (150) located on the upper surface (112) of the cradle (110) to assist in guiding and the passage of the smaller vehicle or body onto and off the cradle (110).

The rollers (150) are free-rotating rollers and are serially arranged along a centre line and the opposed sides of the upper surface (112) of the cradle (110).

The rollers (150) serially arranged along the opposed sides of the upper surface (112) of the cradle (110) are pivotally mounted and angled inwards.

The rollers (150) serially arranged along the centre line of the cradle (110) are mounted between the inner frame member portions (216b) from each of the U-shaped frame members (210) and are flanged rollers to assist in guiding at least a portion or part of the smaller vehicle or body, such as, e.g., a tyre of a motor cycle or keel of a PWC, along the centre line of the cradle (110) when loading or unloading.

Referring to FIG. 2A, the rotatable platform (120) include a non-rotational lower portion (122) configured to be fastened to an upper surface of a carrier vehicle or structure, a rotatable upper portion (124) and a central shaft (126) extending therebetween fixedly mounted to the rotatable upper portion (124) and rotatably coupled to the non-rotational lower portion (122) via a mount (128) including a rotary bearing.

Referring to both FIGS. 2A and 2B, the non-rotational lower portion (122) includes a substantially circular base (230; i.e., plate) and a sidewall (232) extending upwardly from an edge of the base (230). The sidewall (232) extends around a periphery of the base (230). The base (230) includes openings for receiving mechanical fasteners therethrough for fastening the base (230) to the upper surface of the carrier vehicle or structure.

Referring to both FIGS. 2A and 2C, the rotational upper portion (124) similarly includes a base (240; i.e., plate). Best shown in FIG. 2C, the base (240) includes an edge portion (242) to which the cradle (110) is mounted. A sidewall (244) extends downwardly from a remaining edge of the base (240) to at least partially conceal the non-rotational lower portion (122), as best shown in FIG. 2A.

Referring back to FIG. 1B, the cradle (110) is hingedly connected to the rotatable platform (120) so that the cradle (110) can pivot between the tilted and level positions.

The inner end (118) of the cradle (110) is hingedly connected to the edge portion (242) of the rotational upper portion (124) of the rotatable platform (120).

Specifically, the four protruding ends (212) located at the inner end (118) of the cradle (110) each have a central bore therethrough and are configured to intermesh with three protruding connecting members (243) extending along the edge portion (242) of the rotational upper portion (124) of the rotatable platform (120). Each of the three protruding connecting members (243) also has a central bore therethrough. The protruding ends (212) and the protruding connecting members (243) are pinned together by a pivot pin received through the central bores when co-aligned.

Two hydraulic rams (130) drive movement of the cradle (110) between the tilted and level positions relative to the rotatable platform (120).

As shown in FIG. 2A, the hydraulic rams (130) extend between mounting brackets (180) fastened to an upper surface (112) of the cradle (110) and the rotational upper portion (124) of the rotatable platform (120) for pivoting the cradle (110) between the tilted position when the hydraulic rams (130) are extended and the level position when the hydraulic rams (130) are retracted.

Referring briefly to FIG. 1B, the two hydraulic rams (130) extend at least partially along opposed sides of the upper surface (112) of the cradle (110) to pivot the cradle (110) in a controlled and even manner.

Turning to FIG. 2A, each mounting bracket (180) includes an opening to which a bearing located at each end of each hydraulic ram (130) is pinned with a pivot pin to pivotally couple the mounting brackets (180) and hydraulic rams (130) together.

Referring now to FIGS. 2A and 2B, the system (100) includes an actuating mechanism (140) for rotating the rotatable platform (120) between the operational and storage positions.

Best shown in FIG. 2B, the actuating mechanism (140) includes a crank or lever arm (142) extending perpendicularly from the central shaft (126) and a hydraulic ram (144) pivotally coupled to an outer end of the crank or lever arm (142) and an inner surface of the sidewall (232) of the non-rotational lower portion (122) of the rotatable platform (120). Reciprocating movement of the hydraulic ram (144) between an extended and retracted position imparts rotational movement to the central shaft (126) to rotate the rotational upper portion (124; shown in FIG. 2A) of the rotatable platform (120) relative to the non-rotational lower portion (122).

FIGS. 3A and 3B show another embodiment of the system (100).

Referring to FIG. 3A, in this embodiment the cradle (110) includes a conveying mechanism (310) extending along a centre line of the cradle (110) for conveying the smaller vehicle or body onto and off the cradle (110) rather than a plurality of rollers (150) as shown in the earlier embodiment.

The conveying mechanism (310) includes a conveyor belt (312) extending over and between opposed pulleys (314) located at or near each of the ends (116, 118) of the cradle (110) and supported therebetween by two troughed rollers (316).

The pulleys (314) include a head pulley (314a) located at or near the inner end (118) of the cradle (110) and a tail pulley (314b) located at or near the outer end (116) of the cradle (110). The head pulley (314a) is a powered or driven pulley operatively associated with an electric motor (not shown) for driving movement of the conveyer belt (312).

The conveyer belt (312) is formed of plastic and/or rubber materials and includes a high friction, textured outer surface to facilitate in gripping a smaller vehicle or body.

In particular, the outer surface of the conveyer belt (312) includes a plurality of outwardly protruding ridges (318) to assist in gripping the smaller vehicle or body. The protruding ridges (318) are arranged in opposed or converging diagonal pairs.

Best shown in FIG. 3B, the protruding ridges (318) arranged in opposed or converging diagonal pairs define a space (319) therebetween for at least partially receiving a portion or part of the smaller vehicle or body, such as, e.g., a tyre of a motor cycle or a keel of a PWC to facilitate in keeping the motor cycle or PWC in an upright position when unloading, loading or storing the motor cycle or PWC on the cradle (110).

Figure 4B:
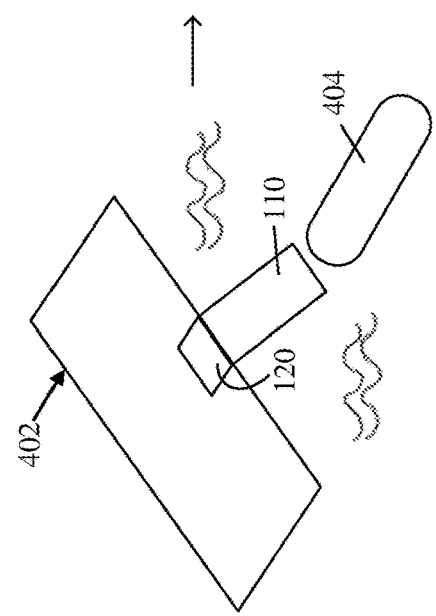
Figure 4F:
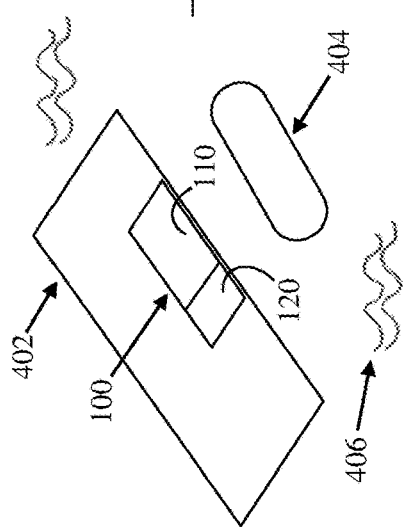
Figure 4C:
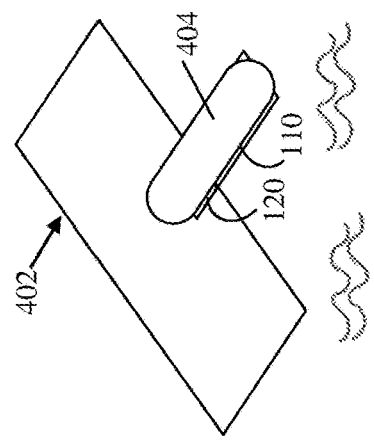
Figure 4D:
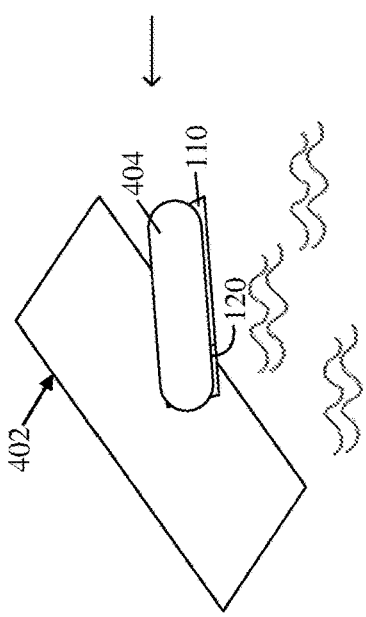
Figure 4E:
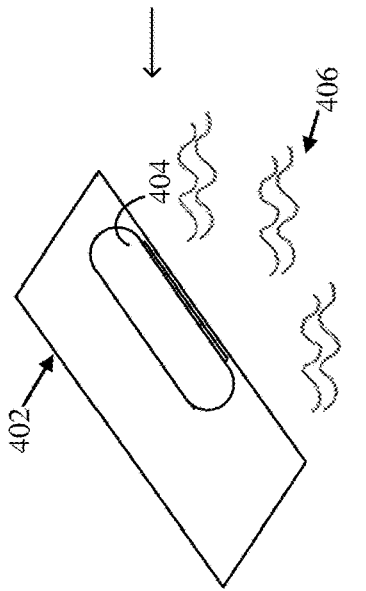

FIGS. 4A to 4F show a simple schematic of a method of loading a jet ski (404) from a body of water (406) onto a swim platform (402) of a boat using the handling system (100) described above. The water (406) may be an ocean, beach, river or lake. The swim platform (402) of the boat could alternatively be a pontoon, pier, or a jetty. The boat is omitted from FIGS. 4A to 4F for clarity. In FIG. 4A the handling system (100) with cradle (110) and rotatable platform (120) is shown in the storage position on swim platform (402). The rotatable platform (120) is mounted to the swim platform (402) and the cradle (110) is hingedly connected to the rotatable platform (120) as described above. A jet ski (404) is shown floating on the water (406). To load the jet ski (404), the rotatable platform (120) is rotated from the storage position about 90° about a vertical axis to the operational position and the cradle (110) is pivoted from its level position to the tilted position shown in FIG. 4B. The jet ski (404) is lined up with the tilted position of cradle (110) as shown in FIG. 4B in preparation for loading before being driven up and onto the cradle (110) as shown in FIG. 4C. The cradle (110) now with loaded jet ski (404) is then pivoted from the tilted position back up to the level position shown in FIG. 4D. The platform (120) is then rotated back about the vertical axis from the operational position to the storage position. FIG. 4E shows the platform (120) has rotated approximately half of the 90° back to the storage position. FIG. 4F shows the platform (120) has been fully rotated back to the storage position with the jet ski (404) now stored on swim platform (402).

Figure 5E:
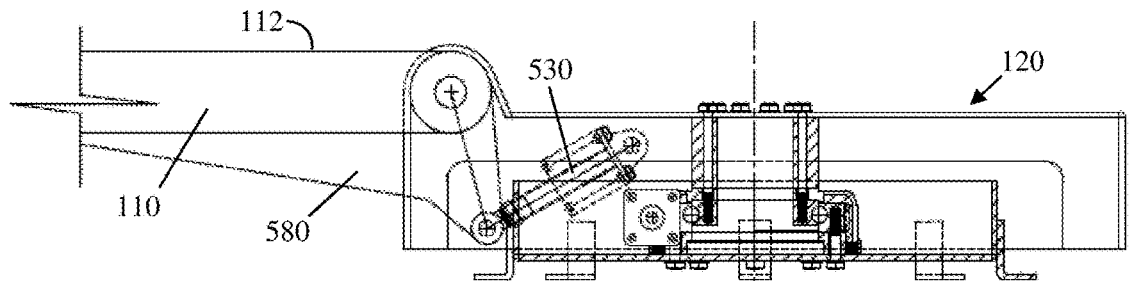
Figure 5F:
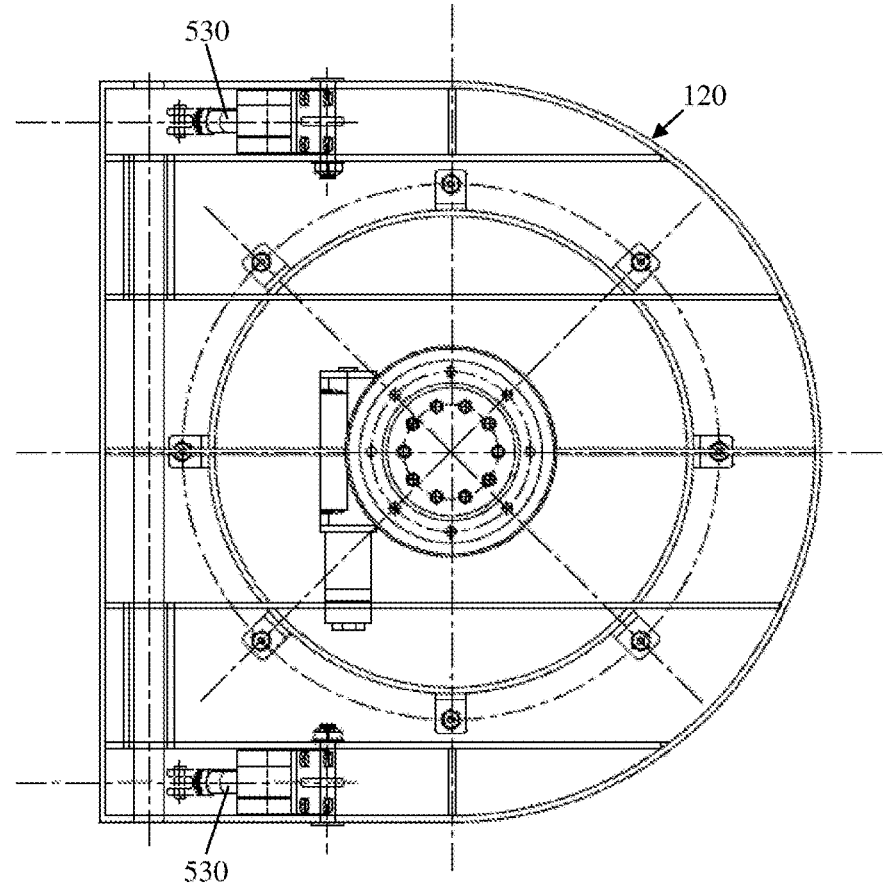

FIGS. 5A to 5F show another embodiment of the handling system (100) which is generally similar to the handling systems (100) of FIGS. 1 to 3. The handling system (100) in FIGS. 5A-5F has a cradle (110) with an upper surface (112) and an opposed lower surface (114), a rotatable platform (120), two mounting brackets (580), and two hydraulic rams (530). One difference between the handling system (100) shown in FIGS. 5A to 5F and the handling systems (100) shown in FIGS. 1 to 3 is that each mounting bracket (580) is fastened to the lower surface (114) of the cradle (110) instead of the upper surface (112). Another difference is that the mounting brackets (580) visible in FIGS. 5A, 5C, and 5E are present only on the cradle (110) and not the upper surface of the rotatable platform (120) as in FIGS. 1A and 2A. Yet another difference is that the hydraulic rams (530) are located inside the rotatable platform (120) while hydraulic rams (130) in FIGS. 1 to 3 are located outside the rotatable platform (120). One end of each hydraulic ram (530) is pinned to a mounting bracket (580) and the other end of the hydraulic ram (530) is fastened to the interior of the rotatable platform (120). FIG. 5A shows the cradle (110) in the level position (solid line) and the tilted position (partial dashed line). The tilt angle (Z) shown in FIG. 5A is 15 degrees as a non-limiting example. The angle (Z) between the level position and the tilted position of the cradle (110) will of course depend on the environment in which the handling system (100) is used such as the vertical height difference between the rotatable platform (120) and the water or ground level. Advantageously, having the mounting brackets (580) on the lower surface of the cradle (110) and the hydraulic rams (530) in the interior of the rotatable platform (120) provides a more aesthetically pleasing appearance of the handling system (100) shown in FIGS. 5A to 5F and avoids any chance of contact that the user, smaller vehicle or body (e.g. jet ski) may have with the mounting brackets (580)/hydraulic rams (530) during loading, unloading and storing of the smaller vehicle or body.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

What is claimed is:

1. A handling system for use with a carrier vehicle or structure for unloading, loading and storing a smaller vehicle or body, said system including:
   a cradle for supporting the smaller vehicle or body therein, said cradle configured to be pivotable between a tilted position in which said smaller vehicle or body can be unloaded from or loaded into the cradle and a level position in which said smaller vehicle or body is retained in said cradle;
   a rotatable platform mounted to said carrier vehicle or structure to which said cradle is mounted, said platform capable of rotating at least 90° about a vertical axis between an operational position in which said cradle is able to pivot and a storage position in which said smaller vehicle or body is stored aboard the carrier vehicle or structure;
   at least one linear actuator for driving movement of said cradle between said tilted position and said level position; and
   wherein the rotatable platform comprises:
   a non-rotational lower portion fastened to the carrier vehicle or structure; and
   a rotatable upper portion rotatably coupled to the non-rotational lower portion such that the upper portion rotates relative to the lower portion.

2. The handling system of claim 1, wherein the cradle is pivotally mounted to the rotatable upper portion.

3. The handling system of claim 1, wherein the non-rotational lower portion is a substantially circular plate comprising one or more openings for receiving one or more mechanical fasteners therethrough for fastening the plate to the carrier vehicle or structure.

4. The handling system of claim 1, wherein the non-rotational lower portion comprises at least one sidewall extending upwardly from the edge of the non-rotational lower portion and extending around the entire periphery of the non-rotational lower portion.

5. The handling system of claim 1, wherein the rotatable upper portion is a plate comprising at least one sidewall extending downwardly from the edge of the rotatable upper portion and extending at least partially around a periphery of the rotatable upper portion.

6. The handling system of claim 1, comprising a central shaft extending between the non-rotational lower portion and the rotatable upper portion for rotatably coupling said portions together.

7. The handling system of claim 6, wherein the central shaft is fixedly mounted to the rotatable upper portion and rotatably coupled to the non-rotational lower portion via a mount including a rotary bearing.

8. The handling system of claim 1, wherein an inner end of the cradle is hingedly connected or coupled to the edge portion of the rotatable upper portion;
   the edge portion of the rotatable upper portion includes at least one protruding connecting member having a central bore therethrough; and
   the inner end of the cradle includes at least two protruding connecting members each having a central bore therethrough configured to intermesh with the at least one protruding connecting member on the rotatable upper portion and be pinned together by a least one pivot pin received through the central bores when co-aligned.

9. The handling system of claim 1, further comprising an actuating mechanism for rotating the rotatable upper portion relative to the non-rotational lower portion between the operational position and the storage position.

10. The handling system of claim 9, wherein the actuating mechanism is actuated using a drive system, and wherein the drive system comprises:
    a crank or lever arm extending perpendicularly from the central shaft; and
    at least one linear actuator pivotally coupled to an outer end of the crank or lever arm and an inner periphery of the non-rotational lower portion.

11. The handling system of claim 10, wherein the drive system comprises an actuator selected from:
    a reduction gear consisting of a worm shaft and worm gear; or
    a planetary reducer driving the rotatable upper portion between the operational position and the storage position, wherein the planetary reducer is driven manually or by a motor selected from the group consisting of a hydraulic motor, a pneumatic motor, and an electric motor.

12. The handling system of claim 1, wherein the cradle has the form of a frame comprising:
    a pair of U-shaped frame members extending longitudinally between the outer end and the inner end of the cradle; and
    at least three transversely extending cross frame members for joining together the pair of U-shaped frame members.

13. The handling system of claim 12, wherein each U-shaped frame member comprises:
    a pair of protruding ends located at the inner end of the cradle;
    a U-shaped portion located at and defining the outer end of the cradle; and
    a pair of frame member portions extending longitudinally between the protruding ends and the U-shaped portion;
    wherein each frame member portion comprises:
       an outer frame member portion defining a longitudinal side of the cradle; and
       an inner frame member portion extending parallel to the outer frame member portion.

14. The handling system of claim 1, wherein the cradle comprises a conveying mechanism for conveying the smaller vehicle or body onto and off the cradle, and wherein the conveying mechanism extends along a centerline of the cradle.

15. The handling system of claim 14, wherein the conveying mechanism comprises a conveyor belt extending over and between opposed pulleys located at or near each end of the cradle and supported therebetween by one or more troughed rollers, and wherein the opposed pulleys comprise:
   a powered or driven head pulley located at or near an inner end of the cradle; and
   a tail pulley located at or near the outer end of the cradle.

16. The handling system of claim 15, wherein the outer surface of the conveyer belt comprises a plurality of outwardly protruding ridges to assist in gripping the smaller vehicle or body.

17. The handling system of claim 16, wherein the protruding ridges are arranged in opposed or converging diagonal pairs that define a space therebetween for at least partially receiving a portion or part of the smaller vehicle or body.

18. A method of unloading or loading a smaller vehicle or body from a carrier vehicle or structure using the system of claim 1, said method including:
   rotating said cradle mounted to an operational position; and
   pivoting said cradle to the tilted position in which the smaller vehicle or body can be unloaded from or loaded onto said cradle.

* * * * *